(12) United States Patent
Happonen (10) Patent No.: US 7,934,167 B2
(45) Date of Patent: Apr. 26, 2011

(54) SCROLLING DEVICE CONTENT (75) Inventor: Aki Petri Happonen, Kiiminki (FI)

(73) Assignee: Nokia Corporation, Espoo (FI)

( * ) Notice: Subject to any disclaimer, the term of this patent is extended or adjusted under 35 U.S.C. 154(b) by 394 days.

(21) Appl. No.: 12/241,729

(22) Filed: Sep. 30, 2008

(65) Prior Publication Data
US 2010/0083166 A1    Apr. 1, 2010

(51) Int. Cl.
*G06F 3/048* (2006.01)
(52) U.S. Cl. ......... 715/786; 715/783; 715/830; 715/833
(58) Field of Classification Search .................. 715/764, 715/783–788, 818, 830, 833, 845, 851, 855
See application file for complete search history.

(56) References Cited

U.S. PATENT DOCUMENTS

| | | | |
|---|---|---|---|
| 5,121,114 A * | 6/1992 | Nagasawa et al. | 345/688 |
| 2005/0091606 A1 * | 4/2005 | Sauermann | 715/788 |
| 2007/0150830 A1 * | 6/2007 | Ording et al. | 715/784 |
| 2008/0303786 A1 * | 12/2008 | Nakamura et al. | 345/156 |
| 2009/0007188 A1 * | 1/2009 | Omernick | 725/62 |
| 2009/0183076 A1 * | 7/2009 | Shim et al. | 715/716 |
| 2010/0211920 A1 * | 8/2010 | Westerman et al. | 715/863 |

* cited by examiner

*Primary Examiner* — Tadeese Hailu
(74) *Attorney, Agent, or Firm* — Perman & Green, LLP (57) ABSTRACT

A method including displaying content on a display of a device, dividing the display into two or more display sections with a first pointing device where each of the two or more display sections includes a respective portion of the content, and scrolling the respective portion of the content in at least one of the two or more display sections with a second pointing device such that non-contiguous content is displayed in the two or more display sections.

20 Claims, 8 Drawing Sheets

SCROLLING DEVICE CONTENT

BACKGROUND

1. Field

The aspects of the disclosed embodiments generally relate to viewing content in a device and more particularly to scrolling through content in a mobile device.

2. Brief Description of Related Developments

Generally, it is difficult to view and/or compare content on devices, such as for example mobile communication devices, having small displays because only a portion of the content is visible at one time. To view and/or compare the content with the small display a user generally scrolls the content back and forth between portions of the content, for example, being compared or viewed. As a non-limiting example, a user may desire to compare the first and last items in a list of items presented on the display, however, the first and last items may not be presented on the display at the same time due to, for example the a size of the list in conjunction with the small display. As such, the user generally scrolls back and forth between the first and last items in the list to make the comparison.

It would be advantageous to be able to view and/or compare content presented on a display such that the content being viewed and/or compared are presented simultaneously on the display.

SUMMARY

In one aspect of the disclosed embodiments, a method is provided. The method includes displaying content on a display of a device, dividing the display into two or more display sections with a first pointing device where each of the two or more display sections includes a respective portion of the content, and scrolling the respective portion of the content in at least one of the two or more display sections with a second pointing device such that non-contiguous content is displayed in the two or more display sections.

In another aspect of the disclosed embodiments, an apparatus is provided. The apparatus includes a display, and a processor connected to the display, the processor being configured to cause a presentation of content on the display, detect a first input from a first pointing device and cause the display to be divided into two or more display sections, each display section including a respective portion of the content, and detect a second input from a second pointing device and cause a scrolling of the respective content in at least one of the two or more display sections.

In yet another aspect of the disclosed embodiments, a computer program product is provided. The computer program product includes a computer useable medium stored in a memory having computer readable code means embodied therein for causing a computer to non-contiguously display a content on a display. The computer readable code means in the computer program product includes computer readable program code means for causing a computer to detect a first input from a first pointing device and cause the display to be divided into two or more display sections, each display section including a respective portion of the content, and computer readable program code means for causing a computer to detect a second input from a second pointing device and cause a scrolling of the respective content in at least one of the two or more display sections.

I still another aspect of the disclosed embodiments, a user interface is provided. The user interface includes a multi-touch display for displaying content, and a processor connected to the display and configured to detect at least a first and second input on the multi-touch display, wherein the first and second input are detected substantially simultaneously, cause a division of the display into two or more display sections in response to the first input, where each display section includes a respective portion of the display content, and cause scrolling of the respective portion of the display content in response to the second input so that non-contiguous content is presented on the display.

BRIEF DESCRIPTION OF THE DRAWINGS

The foregoing aspects and other features of the embodiments are explained in the following description, taken in connection with the accompanying drawings, wherein.

DETAILED DESCRIPTION OF THE EMBODIMENT(S)

Figure 1:
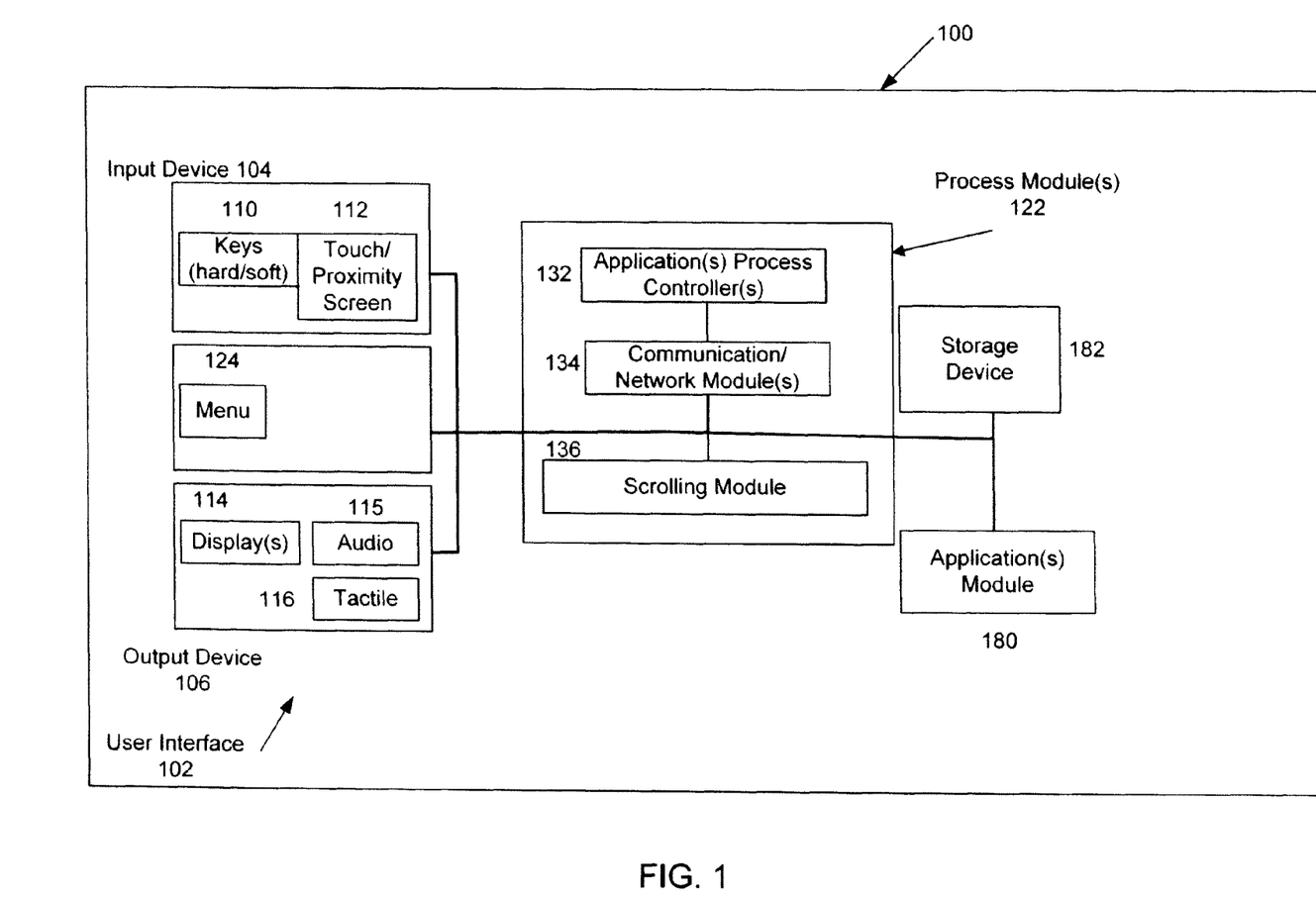
FIG. 1 shows a block diagram of a system in which aspects of the disclosed embodiments may be applied.

FIG. 1 illustrates one embodiment of a system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

The aspects of the disclosed embodiments generally allow a user to scroll content on a small display such that two or more suitable portions of the display can be simultaneously viewed. Generally content viewed on small displays such as those found on portable communication devices is larger than the display so that only a small portion of the content may be presented on the display at one time. As such that the content is generally scrolled on the display or otherwise navigated through to explore the entirety of the content. In one aspect of the disclosed embodiments, the display may be divided into two or more display sections, where each display section includes a respective portion of the content. For exemplary purposes only, the displayed content may include one or more of a list, a spreadsheet, a web page, address/phone books, word processing documents, images, pictures, maps or any other suitable document or combination of documents stored in or accessible by the system 100. The disclosed embodiments effectively treat each display section as an individual display to allow for individual scrolling of the content in each of the two or more display sections. Individually scrolling the content in each display section allows for the presentation of a desired portion of the content in each display area for viewing and/or comparing.

As a non-limiting example, the disclosed embodiments will be described with respect to the presentation of a list of items on the display but it should be understood that any suitable display content, including but not limited to the types of content described above, may be presented and scrolled in the manner described herein. In one example, the display may be divided into two sections where a beginning of a list is displayed in a first section of the display. A content of the second section of the display may be scrolled so that an end of the list is shown simultaneously with the beginning of the list, where the beginning and end of the list would not otherwise be presented together on the display.

Referring to FIG. 1, the system 100 of the disclosed embodiments can generally include input device(s) 104, output device(s) 106, process module 122, applications module 180, and storage/memory device(s) 182. The components described herein are merely exemplary and are not intended to encompass all components that can be included in the system 100. The system 100 can also include one or more processors or computer program products to execute the processes, methods, sequences, algorithms and instructions described herein.

The input device(s) 104 are generally configured to allow a user to input data, instructions and commands to the system 100. In one embodiment, the input device 104 can be configured to receive input commands remotely or from another device that is not local to the system 100. The input device 104 can include devices such as, for example, keys 110, touch screen 112 and menu 124. In alternate embodiments the input device 104 can comprise any suitable device(s) or means that allows or provides for the input of data, information and/or instructions to a device, as described herein.

The output device(s) 106 are configured to allow information and data to be presented via the user interface 102 of the system 100 and can include one or more devices such as, for example, a display 114 (which can be part of or include a touch screen 112), audio device 115 or tactile output device 116. In one embodiment, the output device 106 can be configured to transmit information to another device, which can be remote from the system 100. While the input device 104 and output device 106 are shown as separate devices, in one embodiment, the input device 104 and output device 106 can be combined into a single device, and be part of and form, the user interface 102. The user interface 102 of the disclosed embodiments can be generally configured to allow a user to divide the display 114 into two or more display sections and scroll a content presented in a respective display section independent of a content presented in other different ones of the two or more display sections. While certain devices are shown in FIG. 1, the scope of the disclosed embodiments is not limited by any one or more of these devices, and an exemplary embodiment can include additional devices or exclude one or more of the devices shown. For example, in one exemplary embodiment, the system 100 may only provide a touch screen 112 capable of presenting one or more soft keys (e.g. the system 100 does not include any hard or dedicated keys). In other examples, a headset, or other listening device, can be used as part of both the input devices 104 and output devices 106 so that the display can be divided into two or more display sections and content can be scrolled in an audible fashion.

The process module 122 is generally configured to execute the processes and methods of the disclosed embodiments. The application process controller 132 can be configured to interface with the applications module 180, for example, and execute applications processes with respect to the other modules of the system 100. In one embodiment, the applications module 180 is configured to interface with applications that are stored either locally to or remote from the system 100 and/or web-based applications. The applications module 180 can include any one of a variety of applications that may be installed, configured or accessed by the system 100, such as for example, office, business, media players and multimedia applications, web browsers and maps. In alternate embodiments, the applications module 180 can include any suitable application. The communication module 134 shown in FIG. 1 is generally configured to allow the device to receive and send communications and messages, such as text messages, chat messages, multimedia messages, video and email, for example. The communication module 134 is also configured to receive information, data and communications from other devices and systems.

Figure 2A:
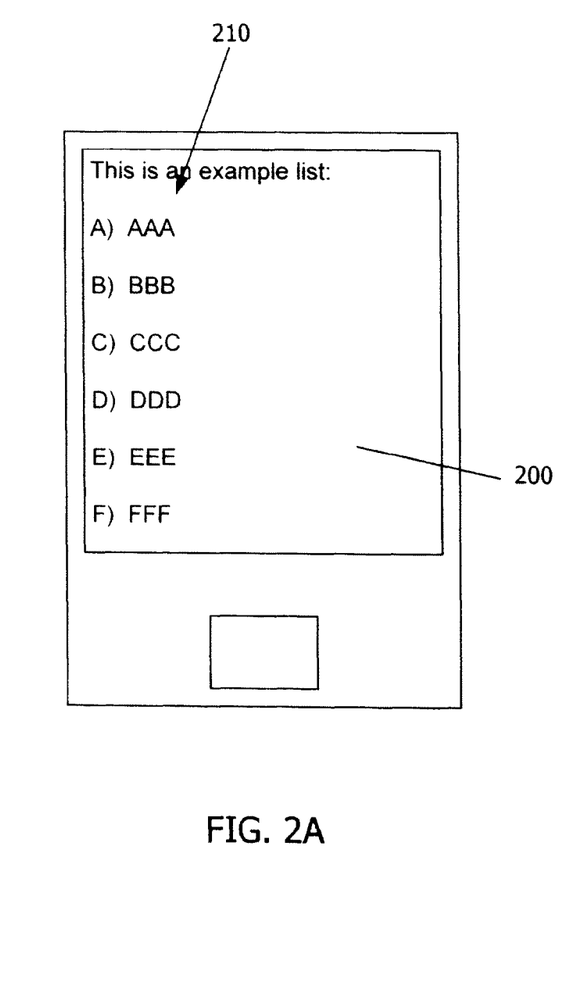
FIGS. 2A-2D illustrate an exemplary application of aspects of the disclosed embodiments.
Figure 2B:
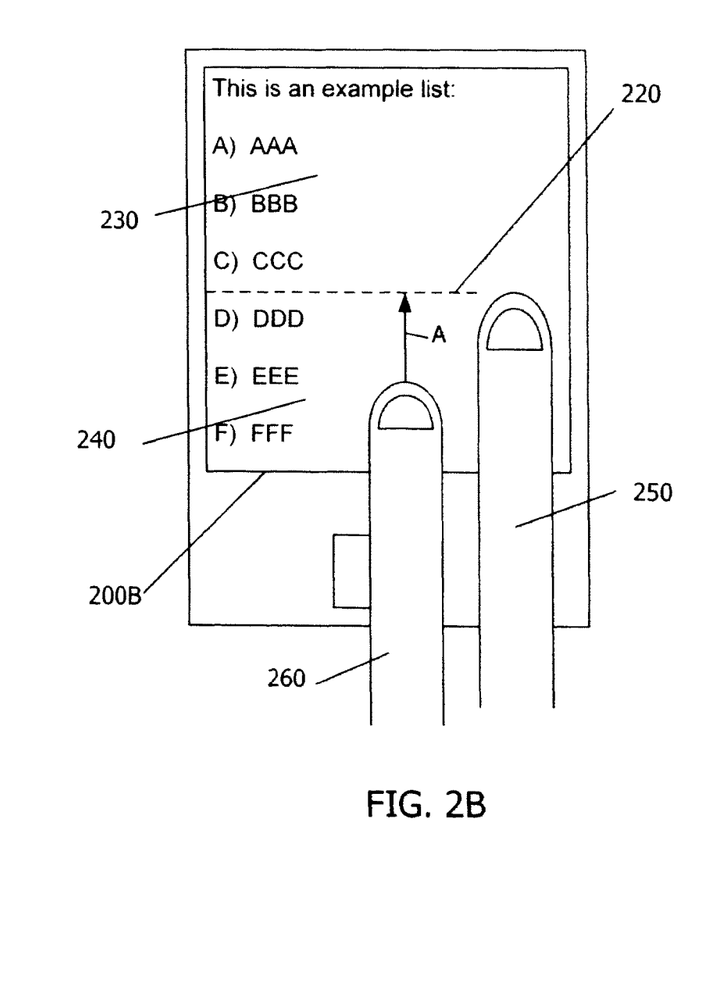
Figure 2C:
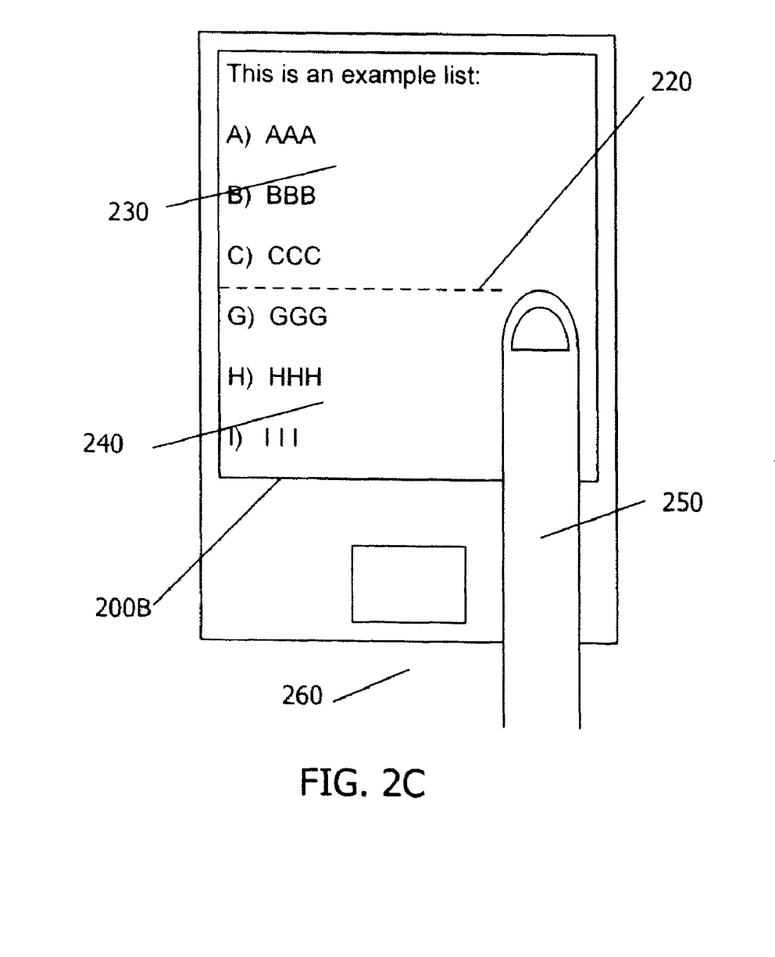
Figure 2D:
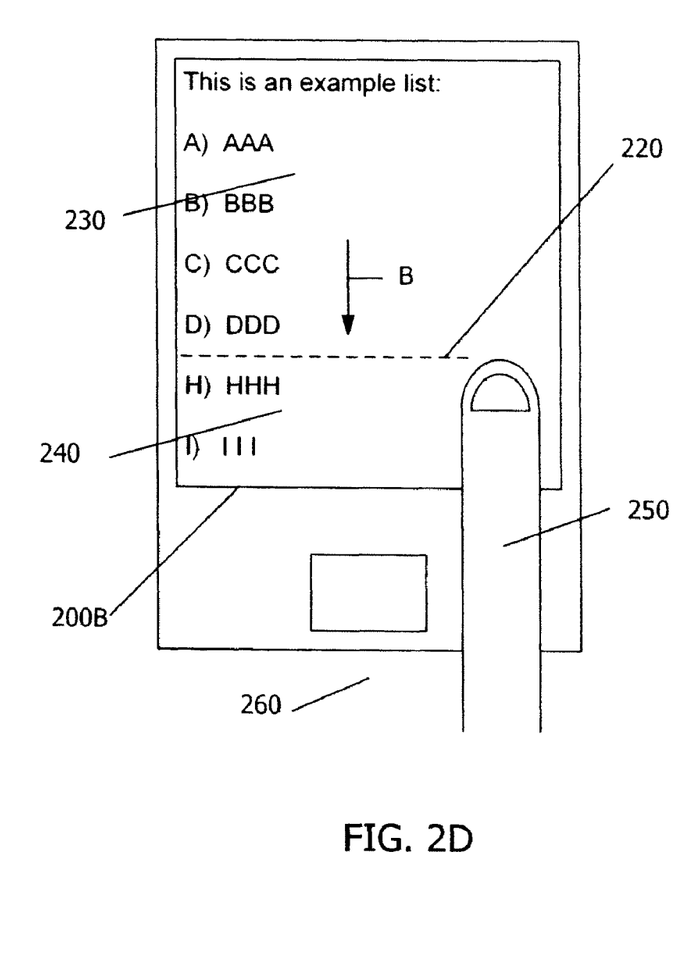

In one aspect of the disclosed embodiments, the process module 122 includes a scrolling module 136 for allowing the process module 122 to carryout aspects of the disclosed embodiments described herein. In one embodiment, the scrolling module 136 may be integral to the process module 122. In alternate embodiments the scrolling module 136 may be separate from the process module 122. The scrolling module 136 may be configured to divide the display 114 into one or more display sections such that each display section includes a respective portion of a displayed content. Referring also to FIGS. 2A-2C, an exemplary display 200 is shown. The display 200 may be substantially similar to display 114 unless otherwise noted. In this example, a list 210 of items is presented on the display 200. The display 200 may be divided into a first display section 230 and a second display section 240 by the scrolling module 136. In alternate embodiments, the display may be divided into any suitable number of sections. One or more dividers or virtual display section barriers 220 may be presented on the display 200 to indicate, for example, the border of each display section. In this example, the divider 200 is presented as a substantially straight line disposed generally in the direction of the text (e.g. the divider is substantially parallel with the lines of text). In alternate embodiments the divider may have any suitable shape, configuration and/or orientation relative to the display contents. For example, in alternate embodiments, the orientation of the divider 220 may be adjustable by, for example, moving the pointing device 250 (or more than one pointing device) relative to the display 200 in any suitable manner. For example, the divider 220 may include a first end 220A and a second end 220B. One end of the divider 220A may be stationary while the second end 220B may be movable depending on a position of the pointing device 250. In another example, both ends 220A, 220B may be movable depending on a position of two pointing devices (e.g. one pointing device located at each end of the divider 220). In still other alternate embodiments, the different display sections may be indicated as such by presenting the different display sections with respective background colors (e.g. display section 230 has a first background color and display section 240 has a second background color, where the first and second background colors are different from each other). In accordance with one aspect of the disclosed embodiments, the size of the display sections 230, 240 may also be adjusted by, for example, moving the pointing device relative to the display 200. For example, as can be seen in FIG. 2D the position of the divider 220 may be moved towards a bottom 200B of the display so that the size of the display section 230 is increased and the size of display section 240 is decreased.

The scrolling module 136 may be configured so that each display section 230, 240 is individually operable to act as, for example, a separate display. For example, initially when the display is divided into one or more section, the content presented in the one or more section may be contiguous (e.g. presented in an unbroken sequence). As can be seen in FIG. 2B, when the display 200 is initially divided into display sections 230, 240 the items in the list 210 are contiguously presented as they would be if the display sections were not created. For example, the items in the list 230 are presented as consecutively organized items (e.g. organized with consecutive letters A, B, C, D . . . ). In this example, the display 200 is sized so that only six items (e.g. items A-F) in the list 210 are presented at a time on the display 200. In accordance with an aspect of the disclosed embodiments, the content on each display section 230, 240 may be individually scrolled so that non-contiguous portions of the content are presented in a respective display section. The scrolling module 136 is configured so that the one or more of the sections may be scrolled so that the items in the list are no longer contiguous. For example, as can be seen in FIGS. 2B and 2C, the display section 240 is scrolled in the direction of arrow A so that items G through I are presented in the display section 240 while the presentation of items A through C in display section 230 remains unchanged. Scrolling the content of each individual display section 230, 240 independently of the content in other different ones of the display sections 230, 240 allows for simultaneous viewing of non-contiguous portions of the content so that the non-contiguous content may be, for example, compared side by side and/or viewed simultaneously for any other suitable purposes. It should be understood that the content of any one of the two of the two or more display sections may be scrolled or otherwise navigated through in the manner described herein.

Figure 3:
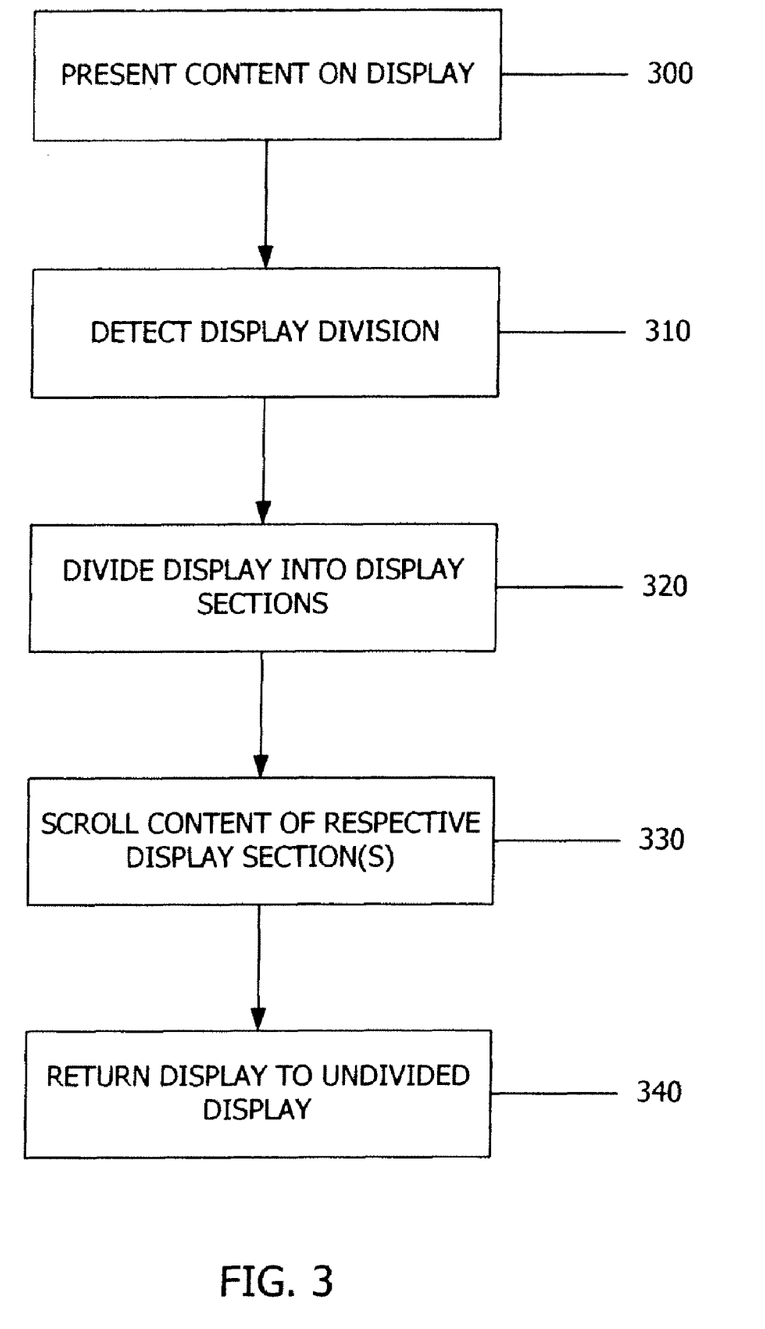
FIG. 3 illustrates an example of a content scrolling process incorporating aspects of the disclosed embodiments.

Referring to FIGS. 2A-2C and 3 an exemplary process in accordance with an aspect of the disclosed embodiments will be described. In accordance with an aspect of the exemplary embodiments, any suitable content, such as the list 210, is presented on the display 200 (FIG. 3, Block 300). The process module 122 (FIG. 1), which includes the scrolling module 136 (FIG. 1), is configured to detect a division of the display (FIG. 3, Block 310). In one aspect the process module 122 may be configured to detect the display division through, for example, the touch screen 112 (FIG. 1) which may be part of the display 200. For example, any suitable pointing device 250, such as a user's finger or stylus, may be brought into substantial contact or proximity with a predetermined location on the display 200. The process module 122 may be configured to detect the pointing device and place a divider 220 on the display at the predetermined location for dividing the display into display sections 230, 240 (FIG. 3, Block 320).

When the display 200 is divided into display sections 230, 240 the content presented in each display section 230, 240 can be scrolled independently of the content presented in the other display sections. For example, referring to FIG. 2B the content of display section 240 may be scrolled independently of the content presented in display section 230. In one aspect a pointing device 260 may be used to scroll the contents of the display section 340. In one embodiment, where the display 200 includes a "single touch" screen (e.g. where only one pointing device is used to navigate on and about the screen) the pointing device 260 may be the same pointing device as pointing device 250. In another embodiment, where the display 200 includes a "multi-touch" screen (e.g. where one or more pointing devices can navigate on and about the screen) the pointing device 260 may be a second pointing device that is used on the screen in conjunction with pointing device 250. The process module 122 may be configured to detect contact or a proximity connection between the second pointing device 260 and the display 200 as well as motion of the second pointing device 260 relative to the display 200. For example, the process module 122 may detect that the second pointing device 260 is moved in the direction of arrow A and cause the content of the display section 340 to be moved or scrolled in the same direction the pointing device 260 is moved (e.g. in the direction of arrow A) (FIG. 3, Block 330). As can be seen in FIG. 2C, scrolling of the content in display section 240 caused the content to change so that, for exemplary purposes only, items G through I are presented in the display section 240 while the content of display section 230 remains unchanged. It should be understood that the content of the display section 240, or any other display section, may be scrolled in any suitable direction so that a desired portion of the display content is presented in a respective display section.

The divided display as shown in FIGS. 2B and 2C may be returned to the undivided display as shown in FIG. 2A in any suitable manner (FIG. 3, Block 340). In one aspect of the disclosed embodiments, where for example the display is a "multi-touch" display, the divider 220 (or any other suitable indicator) is presented on the display 200 and the display remains divided into display sections as long as an input from the pointing device is detected and sustained. For example, the display is divided into display sections when the pointing device 250 is in substantial contact or proximate the display and is returned to an undivided or contiguous display as shown in FIG. 2A when the pointing device 250 is substantially removed from the display. In other aspects of the disclosed embodiments, where the display includes a "single-touch" display, the divider 220 may be placed on the display 200 through detection of a first touch of the pointing device 250 at the predetermined location and removed from the display through a detection of a second touch at the predetermined location such that when the divider is removed the display returns to an undivided or contiguous display as shown in FIG. 2A. In alternate embodiments, the display 200 may be divided into display sections 230, 240 and/or returned to the undivided display 200 in any suitable manner such as through a multi-function or scroll key (or any other suitable keys or pointing devices; see e.g. keys 430, 454 in FIGS. 4A and 4B) of the system 100.

Referring to FIG. 1, in one embodiment as described above, the user interface of the disclosed embodiments can be implemented on or in a device that includes a touch screen display 112, proximity screen device or other graphical user interface. In one embodiment, the display 112 can be integral to the system 100. In alternate embodiments the display may be a peripheral display connected or coupled to the system 100. A pointing device, such as for example, a stylus, pen or simply the user's finger may be used with the display 112. In alternate embodiments any suitable pointing device may be used. The display can also include or comprise, for example, a flat display that is typically made of a liquid crystal display (LCD) with optional back lighting, such as a thin film transistor (TFT) matrix capable of displaying color images. Although display 114 of FIG. 1 is shown as being associated with output device 106, in one embodiment, displays 112 and 114 form a single display unit.

The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information, such as text, on the screen of the device. Thus, the above noted terms are intended to include that a user only needs to be within the proximity of the device to carry out the desired function. It should also be understood that arrow keys on a keyboard, mouse style devices and other cursors could be used as the pointing device and to move a pointer.

Similarly, the scope of the intended devices is not limited to single-touch or multi-touch contact devices. Non-touch devices are also intended to be encompassed by the disclosed embodiments. Non-touch devices include, but are not limited to, devices without touch or proximity displays or screens, where navigation on the display and menus of the various applications is performed through, for example, keys 110 of the system or through voice commands via voice recognition features of the system.

Figure 4A:
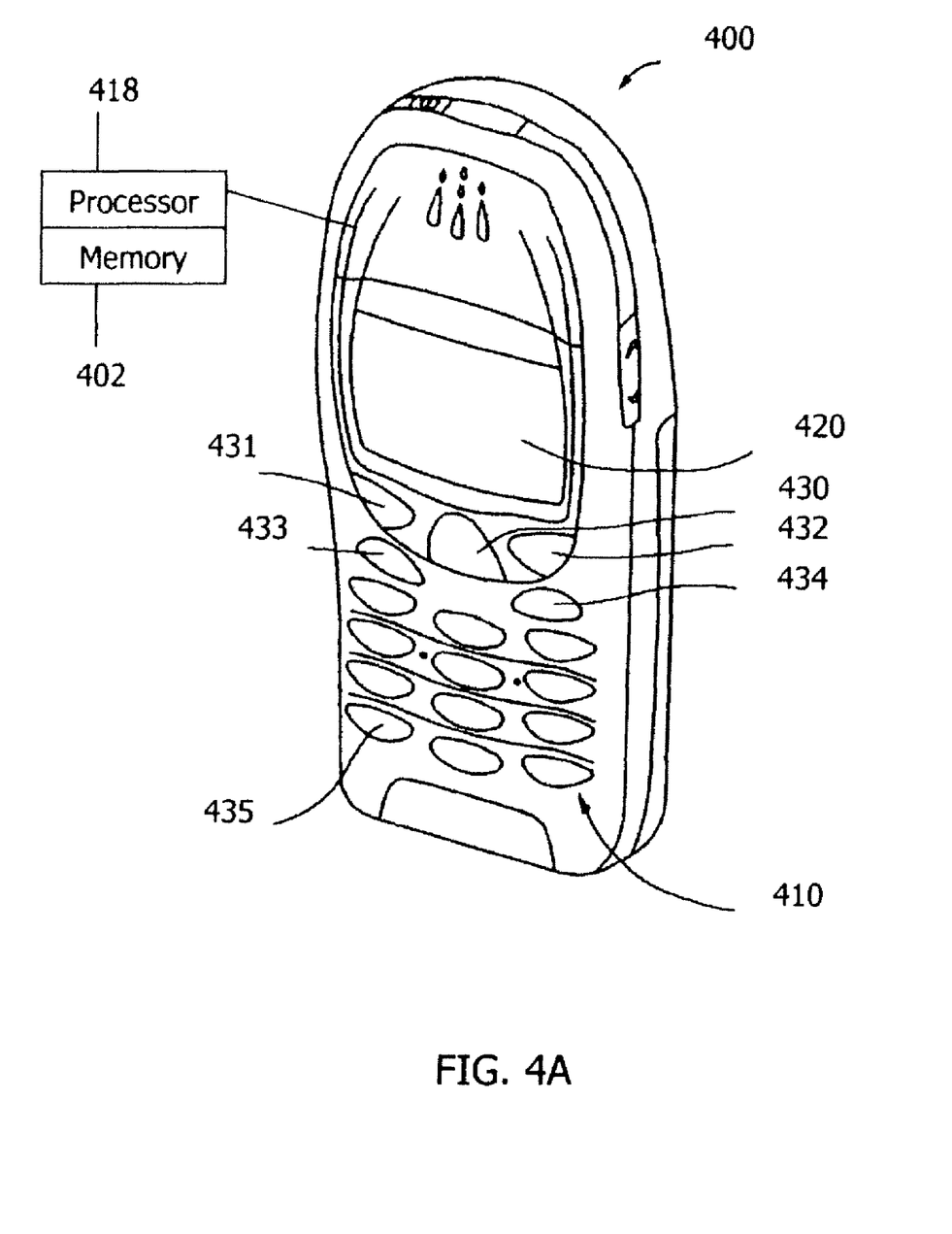
FIGS. 4A and 4B are illustrations of exemplary devices that can be used to practice aspects of the disclosed embodiments.
Figure 4B:
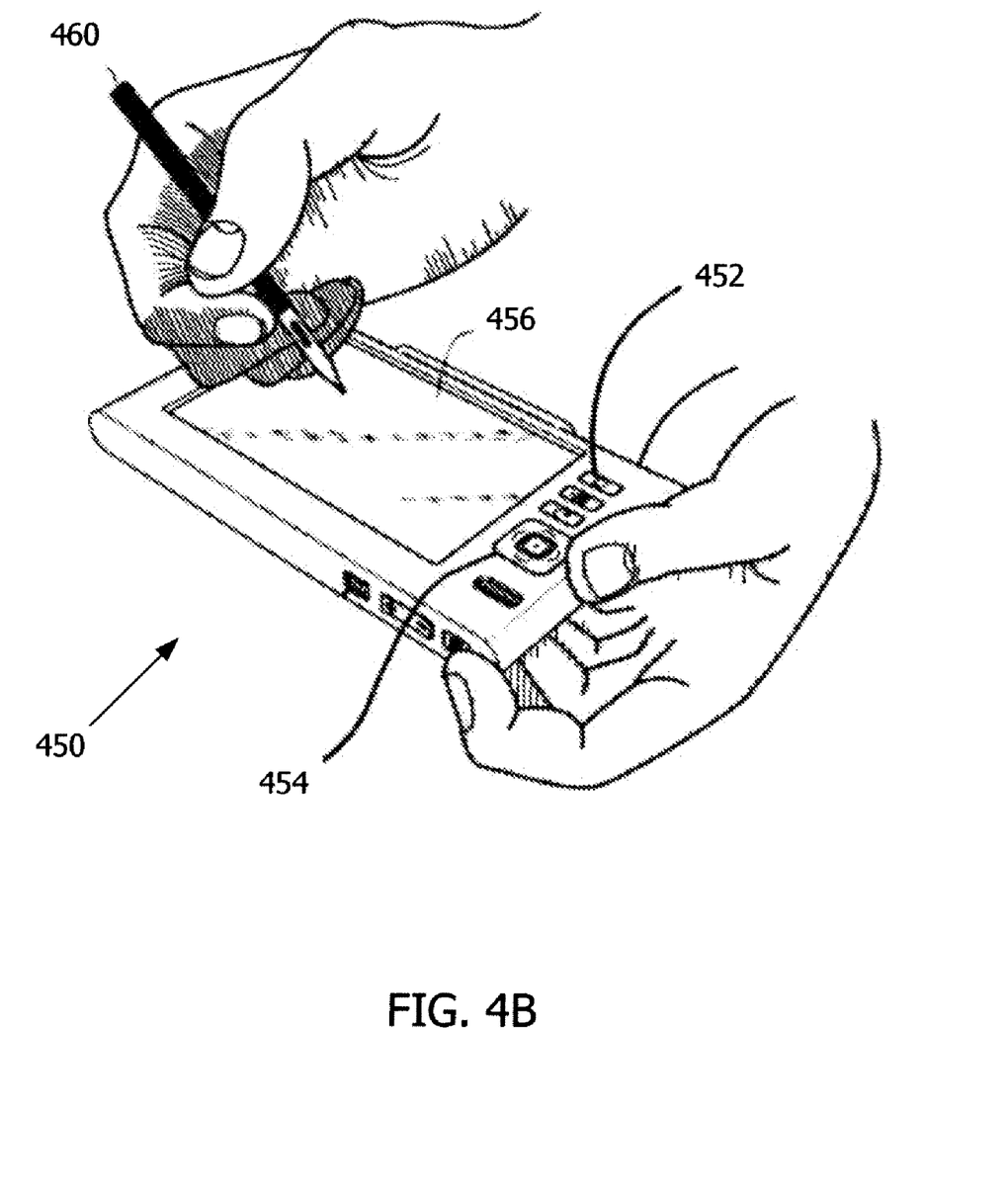

Some examples of devices on which aspects of the disclosed embodiments can be practiced are illustrated with respect to FIGS. 4A-4B. The devices are merely exemplary and are not intended to encompass all possible devices or all aspects of devices on which the disclosed embodiments can be practiced. The aspects of the disclosed embodiments can rely on very basic capabilities of devices and their user interfaces. Buttons or key inputs can be used for selecting and controlling the functions and commands described herein, and a scroll key function can be used to move to and select item(s), such as text.

As shown in FIG. 4A, the device 400, which in one embodiment comprises a mobile communication device or terminal may have a keypad 410 as an input device and a display 420 for an output device. In one embodiment, the keypad 410 forms part of the display unit 420. The keypad 410 may include any suitable user input devices such as, for example, a multi-function/scroll key 430, soft keys 431, 432, a call key 433, an end call key 434 and alphanumeric keys 435. The display 420 may be any suitable display such as, for example, a touch screen display or graphical user interface. The display may be integral to the device 400 or the display may be a peripheral display connected or coupled to the device 400. A pointing device such as, for example, a stylus, pen or simply the user's finger may be used in conjunction with the display 420 for cursor movement, menu selection, text selection and other input and commands. In alternate embodiments, any suitable pointing or touch device may be used. In other alternate embodiments, the display may be a conventional display. The device 400 may also include other suitable features such as, for example, a loud speaker, headset, tactile feedback devices or connectivity port. The mobile communications device may have at least one processor 418 connected or coupled to the display for processing user inputs and displaying information and links on the display 420, as well as carrying out the aspects of the embodiments described herein. At least one memory device 402 may be connected or coupled to the processor 418 for storing any suitable information, data, settings and/or applications associated with the mobile communications device 400.

Figure 5:
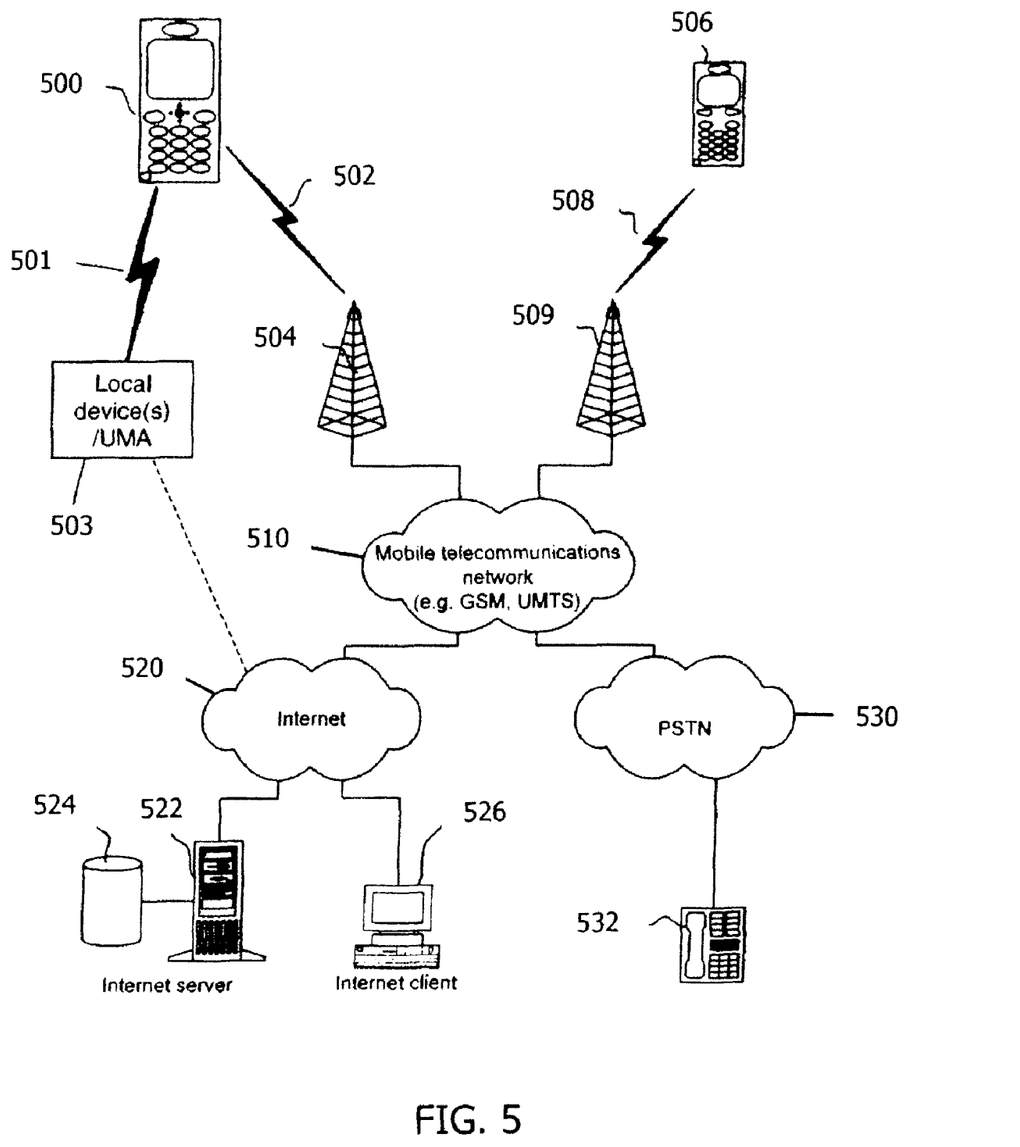
FIG. 5 illustrates a block diagram of an exemplary system incorporating features that may be used to practice aspects of the disclosed embodiments.

In the embodiment where the device 400 comprises a mobile communications device, the device can be adapted for communication in a telecommunication system, such as that shown in FIG. 5. In such a system, various telecommunications services such as cellular voice calls, worldwide web/wireless application protocol (www/wap) browsing, cellular video calls, data calls, facsimile transmissions, data transmissions, music transmissions, multimedia transmissions, still image transmission, video transmissions, electronic message transmissions and electronic commerce may be performed between the mobile terminal 500 and other devices, such as another mobile terminal 506, a line telephone 532, a computing device 526 and/or an internet server 522.

In one embodiment the system is configured to enable any one or combination of chat messaging, instant messaging, text messaging and/or electronic mail, and the text-to-speech conversion process described herein can be applied to the computer understandable text in such messages and/or communications. It is to be noted that for different embodiments of the mobile device or terminal 500, and in different situations, some of the telecommunications services indicated above may or may not be available. The aspects of the disclosed embodiments are not limited to any particular set of services or communication system, protocol or language in this respect.

The mobile terminals 500, 506 may be connected to a mobile telecommunications network 510 through radio frequency (RF) links 502, 508 via base stations 504, 509. The mobile telecommunications network 510 may be in compliance with any commercially available mobile telecommunications standard such as for example the global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 510 may be operatively connected to a wide area network 520, which may be the Internet or a part thereof. An Internet server 522 has data storage 524 and is connected to the wide area network 520, as is an Internet client 526. The server 522 may host a worldwide web/wireless application protocol server capable of serving worldwide web/wireless application protocol content to the mobile terminal 500.

A public switched telephone network (PSTN) 530 may be connected to the mobile telecommunications network 510 in a familiar manner. Various telephone terminals, including the stationary telephone 532, may be connected to the public switched telephone network 530.

The mobile terminal 500 is also capable of communicating locally via a local link 501 to one or more local devices 503. The local links 501 may be any suitable type of link or piconet with a limited range, such as for example Bluetooth™, a Universal Serial Bus (USB) link, a wireless Universal Serial Bus (WUSB) link, an IEEE 802.11 wireless local area network (WLAN) link, an RS-232 serial link, etc. The local devices 503 can, for example, be various sensors that can communicate measurement values or other signals to the mobile terminal 500 over the local link 501. The above examples are not intended to be limiting, and any suitable type of link or short range communication protocol may be utilized. The local devices 503 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 500 may thus have multi-radio capability for connecting wirelessly using mobile communications network 510, wireless local area network or both. Communication with the mobile telecommunications network 510 may also be implemented using WiFi, Worldwide Interoperability for Microwave Access, or any other suitable protocols, and such communication may utilize unlicensed portions of the radio spectrum (e.g. unlicensed mobile access (UMA)).

Although the above embodiments are described as being implemented on and with a mobile communication device, it will be understood that the disclosed embodiments can be practiced on any suitable device incorporating a processor, memory and supporting software or hardware. For example, the disclosed embodiments can be implemented on various types of music, gaming and multimedia devices. In one embodiment, the system 100 of FIG. 1 may be for example, a personal digital assistant (PDA) style device 450 illustrated in FIG. 4B. The personal digital assistant 450 may have a keypad 452, cursor control 454, a touch screen display 456, and a pointing device 460 for use on the touch screen display 456. In still other alternate embodiments, the device may be a personal computer, a tablet computer, touch pad device, Internet tablet, a laptop or desktop computer, a mobile terminal, a cellular/mobile phone, a multimedia device, a personal communicator or any other suitable device capable of containing for example a display 114 shown in FIG. 1, and supported electronics such as the processor 418 and memory 402 of FIG. 4A. In one embodiment, these devices will be Internet enabled.

The user interface 102 of FIG. 1 can also include menu systems 124 coupled to the processing module 122 for allowing user input and commands. The processing module 122 provides for the control of certain processes of the system 100 including, but not limited to, the controls for selecting files and objects, establishing and selecting search and relationship criteria, navigating among the search results, identifying computer readable text, and detecting commands for dividing the display into display sections and scrolling the content presented in each individual section. The menu system 124 can provide for the selection of different tools and application options related to the applications or programs running on the system 100 in accordance with the disclosed embodiments. In the embodiments disclosed herein, the process module 122 receives certain inputs, such as for example, signals, transmissions, instructions or commands related to the functions of the system 100, such as messages, notifications, start and stop points and state change requests. Depending on the inputs, the process module 122 interprets the commands and directs the applications process control 132 to execute the commands accordingly in conjunction with the other modules.

Figure 6:
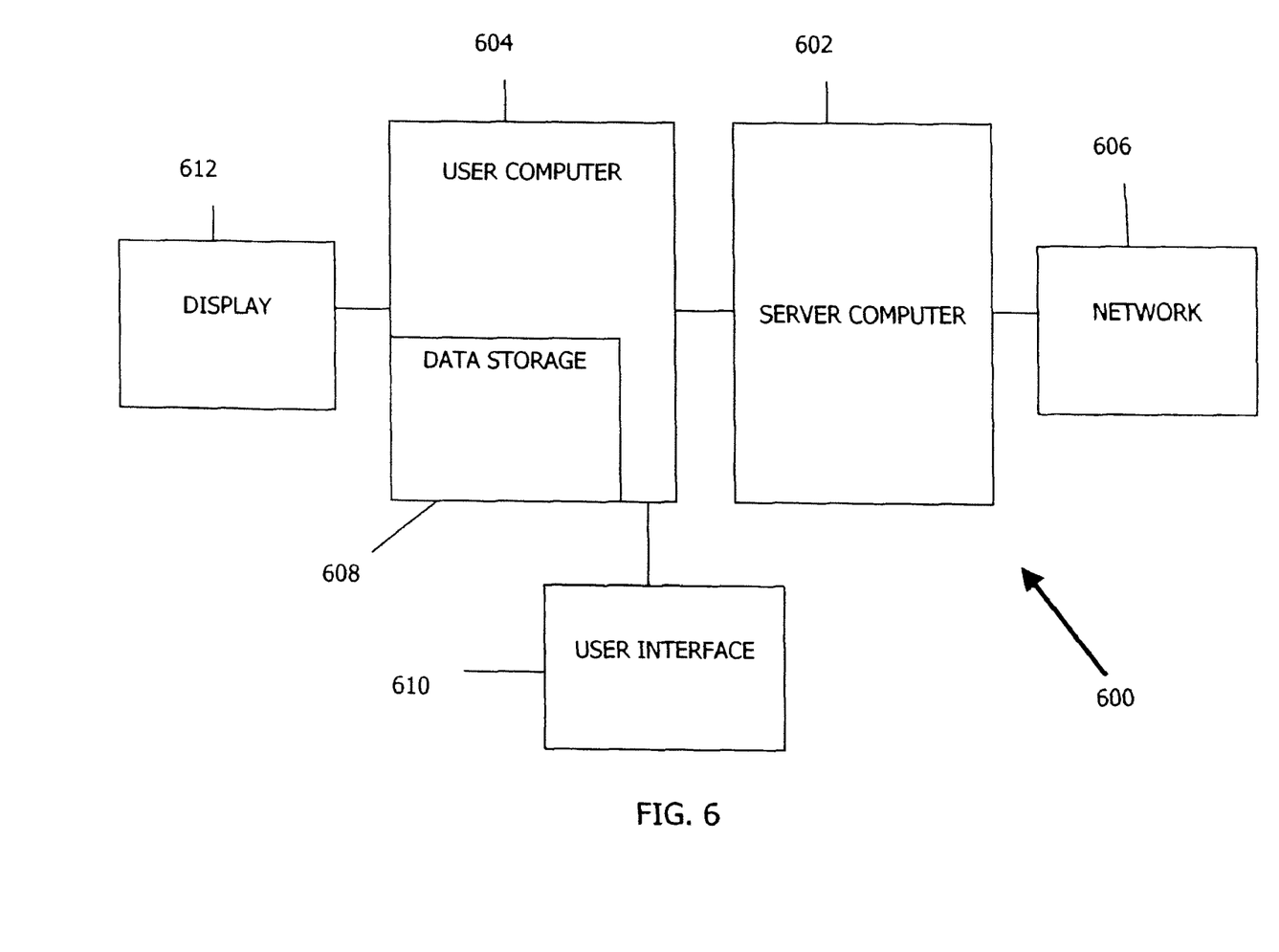
FIG. 6 is a block diagram illustrating the general architecture of an exemplary system in which the devices of FIGS. 4A and 4B may be used.

The disclosed embodiments may also include software and computer programs incorporating the process steps and instructions described above. In one embodiment, the programs incorporating the process steps described herein can be executed in one or more computers. FIG. 6 is a block diagram of one embodiment of a typical apparatus 600 incorporating features that may be used to practice aspects of the invention. The apparatus 600 can include computer readable program code means for carrying out and executing the process steps described herein. In one embodiment the computer readable program code is stored in a memory of the device. In alternate embodiments the computer readable program code can be stored in memory or memory medium that is external to, or remote from, the apparatus 600. The memory can be directly coupled or wirelessly coupled to the apparatus 600. As shown, a computer system 602 may be linked to another computer system 604, such that the computers 602 and 604 are capable of sending information to each other and receiving information from each other. In one embodiment, computer system 602 could include a server computer adapted to communicate with a network 606. Alternatively, where only one computer system is used, such as computer 604, computer 604 will be configured to communicate with and interact with the network 606. Computer systems 602 and 604 can be linked together in any conventional manner including, for example, a modem, wireless, hard wire connection, or fiber optic link. Generally, information can be made available to both computer systems 602 and 604 using a communication protocol typically sent over a communication channel or other suitable connection or line, communication channel or link. In one embodiment, the communication channel comprises a suitable broad-band communication channel. Computers 602 and 604 are generally adapted to utilize program storage devices embodying machine-readable program source code, which is adapted to cause the computers 602 and 604 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

Computer systems 602 and 604 may also include a microprocessor for executing stored programs. Computer 604 may include a data storage device 608 on its program storage device for the storage of information and data. The computer program or software incorporating the processes and method steps incorporating aspects of the disclosed embodiments may be stored in one or more computers 602 and 604 on an otherwise conventional program storage device. In one embodiment, computers 602 and 604 may include a user interface 610, and/or a display interface 612 from which aspects of the invention can be accessed. The user interface 610 and the display interface 612, which in one embodiment can comprise a single interface, can be adapted to allow the input of queries and commands to the system, as well as present the results of the commands and queries, as described with reference to FIG. 1, for example.

The aspects of the disclosed embodiments allow a user to divide a display into display sections such that the content in each display section can be individually scrolled. The individual scrolling of the content in the respective display sections allows for the comparison or viewing of non-contiguous content with a device having a small or limited display. It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
    displaying content on a display of a device;
    dividing the display into two or more display sections with a first pointing device where each of the two or more display sections includes a respective portion of the content; and
    scrolling the respective portion of the content in at least one of the two or more display sections with a second pointing device such that non-contiguous content is displayed in the two or more display sections.

2. The method of claim 1, wherein the method further comprises:
    indicating at least one display section divider with the first pointing device at a predetermined location on the display, wherein the at least one display section divider defines the two or more display sections; and
    moving the second pointing device relative to the display within at least one of the two or more display sections for effecting the scrolling of the respective portion of the content.

3. The method of claim 2, further comprising that indicating the at least one display section divider and moving the second pointing device occur substantially simultaneously.

4. The method of claim 1 further comprising that dividing the display into two or more display sections comprises detecting an input from the first pointing device, where the display remains divided as long as the input is sustained.

5. The method of claim 4, further comprising returning the display to an undivided display when the input is no longer detected.

6. An apparatus comprising:
a display; and
a processor connected to the display, the processor being configured to
cause a presentation of content on the display,
detect a first input from a first pointing device and cause the display to be divided into two or more display sections, each display section including a respective portion of the content, and
detect a second input from a second pointing device and cause a scrolling of the respective content in at least one of the two or more display sections.

7. The apparatus of claim 6, wherein the processor is further configured to cause a presentation of a display section divider on the display, wherein the display section divider defines the two or more display sections.

8. The apparatus of claim 6, wherein the processor is further configured to cause the display to be divided into the two or more display sections as long as the first input is sustained and return the display to an undivided display when the first input is no longer detected.

9. The apparatus of claim 6, wherein the processor is configured to detect the first input and the second input substantially simultaneously.

10. The apparatus of claim 6, wherein the first input comprises a detection of a substantially stationary touching of the display with the first pointing device at a predetermined location and the second input comprises a detection of movement of the second pointing device relative to one of the two or more display sections in which the scrolling of the respective content occurs.

11. The apparatus of claim 6, wherein the scrolling of the respective content in the at least one of the two or more display sections effects a display of non-contiguous content in the two or more display sections.

12. The apparatus of claim 6, wherein the processor is further configured to cause the scrolling of the respective content in at least one of the two or more display sections independent of the respective content in other different ones of the two or more display sections.

13. The apparatus of claim 6, wherein the apparatus comprises a mobile communication terminal.

14. A computer program product comprising:
a computer readable storage medium stored in a memory having computer readable code means embodied therein for causing a computer to non-contiguously display a content on a display, the computer readable code means in the computer program product comprising:
computer readable program code means for causing a computer to detect a first input from a first pointing device and cause the display to be divided into two or more display sections, each display section including a respective portion of the content; and
computer readable program code means for causing a computer to detect a second input from a second pointing device and cause a scrolling of the respective content in at least one of the two or more display sections.

15. The computer program product of claim 14, further comprising computer readable program code means for causing a computer to present a display section divider on the display, wherein the display section divider defines the two or more display sections.

16. The computer program product of claim 14, wherein the display is divided into the two or more display sections as long as the first input is sustained and the display is returned to an undivided display when the first input is no longer detected and wherein the first input and the second input are detected substantially simultaneously.

17. The computer program product of claim 14, wherein the first input comprises a detection of a substantially stationary touching of the display with the first pointing device at a predetermined location and the second input comprises a detection of movement of the second pointing device relative to one of the two or more display sections in which the scrolling of the respective content occurs.

18. The computer program product of claim 14, wherein the scrolling of the respective content in the at least one of the two or more display sections effects a display of non-contiguous content in the two or more display sections.

19. A user interface comprising:
a multi-touch display for displaying content; and
a processor connected to the display and configured to
detect at least a first and second input on the multi-touch display, wherein the first and second input are detected substantially simultaneously, cause a division of the display into two or more display sections in response to the first input, where each display section includes a respective portion of the display content, and
cause scrolling of the respective portion of the display content in response to the second input so that non-contiguous content is presented on the display.

20. The user interface of claim 19, where each of the respective portions of the display content of the two or more display sections is independently scrollable.

* * * * *